United States Patent [19]
Landers

[11] 3,858,765
[45] Jan. 7, 1975

[54] DISPENSING APPARATUS
[75] Inventor: Jerry L. Landers, Sellersburg, Ind.
[73] Assignee: Servend Distributors, Inc., Sellersburg, Ind.
[22] Filed: May 18, 1973
[21] Appl. No.: 361,751

[52] U.S. Cl............................ 222/413, 222/146 C
[51] Int. Cl............................................. G01f 11/24
[58] Field of Search...... 198/213, 64; 222/412, 414, 222/146 C, 236; 62/344

[56] References Cited
UNITED STATES PATENTS

| | | | |
|---|---|---|---|
| 3,211,338 | 10/1965 | Weil et al.................. | 222/146 C X |
| 3,240,313 | 3/1966 | Blattner.................... | 198/213 X |
| 3,268,118 | 8/1966 | Hoenisch.................. | 222/146 C X |
| 3,377,000 | 4/1968 | Mason, Jr................. | 222/412 X |
| 3,409,119 | 11/1968 | Mayrath................... | 198/213 |
| 3,580,428 | 5/1971 | Garber..................... | 222/236 X |
| 3,610,482 | 10/1970 | Van Steenburgh, Jr.... | 222/413 |
| 3,798,923 | 3/1974 | Pink et al.................. | 62/344 X |

FOREIGN PATENTS OR APPLICATIONS

| | | | |
|---|---|---|---|
| 1,347,237 | 11/1963 | France..................... | 222/412 |

Primary Examiner—Stanley H. Tollberg
Assistant Examiner—Norman L. Stack, Jr.
Attorney, Agent, or Firm—Edward J. Brenner

[57] ABSTRACT

A dispensing apparatus is disclosed including a storage bin containing a stirring and circulating auger disposed along the bottom of the bin and a dispensing conveyor extending from the auger to a dispensing outlet.

5 Claims, 7 Drawing Figures 3,858,765

DISPENSING APPARATUS

BACKGROUND OF THE INVENTION

1. Field of the Invention

The present invention pertains to dispensing apparatus and more particularly to dispensing apparatus for removing ice from a bin.

2. Description of the Prior Art

It is a general problem in the art of dispensing materials from bins and the like to remove as much of the material as possible, and to remove the material in as uniform a manner as possible. When the material happens to be of a type such as ice cubes, which have a tendency to fuse to each other after standing in place for a period of time, the complete removal of such becomes more difficult.

Ice dispensers having storage bins have been made which employ the use of rods, as disclosed in U.S. Pat. No. 3,276,224, and paddles, as disclosed in U.S. Pat. No. 3,719,307, to separate fused masses of ice to be dispensed. However, such dispensers are usually not capable of uniformly dispensing the ice and usually leave an excessive ice residue due to the presence of dead spots in the storage bin.

SUMMARY OF THE INVENTION

The present invention is summarized in a dispensing apparatus including a storage bin, conveyor means in the bin for dispensing material therefrom, an auger in the bin positioned along the bottom thereof for rotational movement and having a delivery end positioned proximate the conveyor means, and the bin including an arcuately shaped bottom proximate the auger.

An object of the present invention is to uniformly and almost completely dispense ice from a bin.

It is another object of this invention is to radily free up and circulate large masses of ice cubes in a bin.

Still another object of this invention is to construct a shaped ice bin which facilitates circulation and removal of ice therefrom.

Yet another object of this invention is to effect almost complete circulation of ice in a bin by the use of a single auger.

Still another object of this invention is to produce a dispensing channel which enables a more continuous dispensing of ice therefrom.

Further objects and advantages of the present invention will be apparent from the following description of the preferred embodiments when taken in conjunction with the accompanying drawings.

DESCRIPTION OF THE PREFERRED EMBODIMENT

Figure 1:
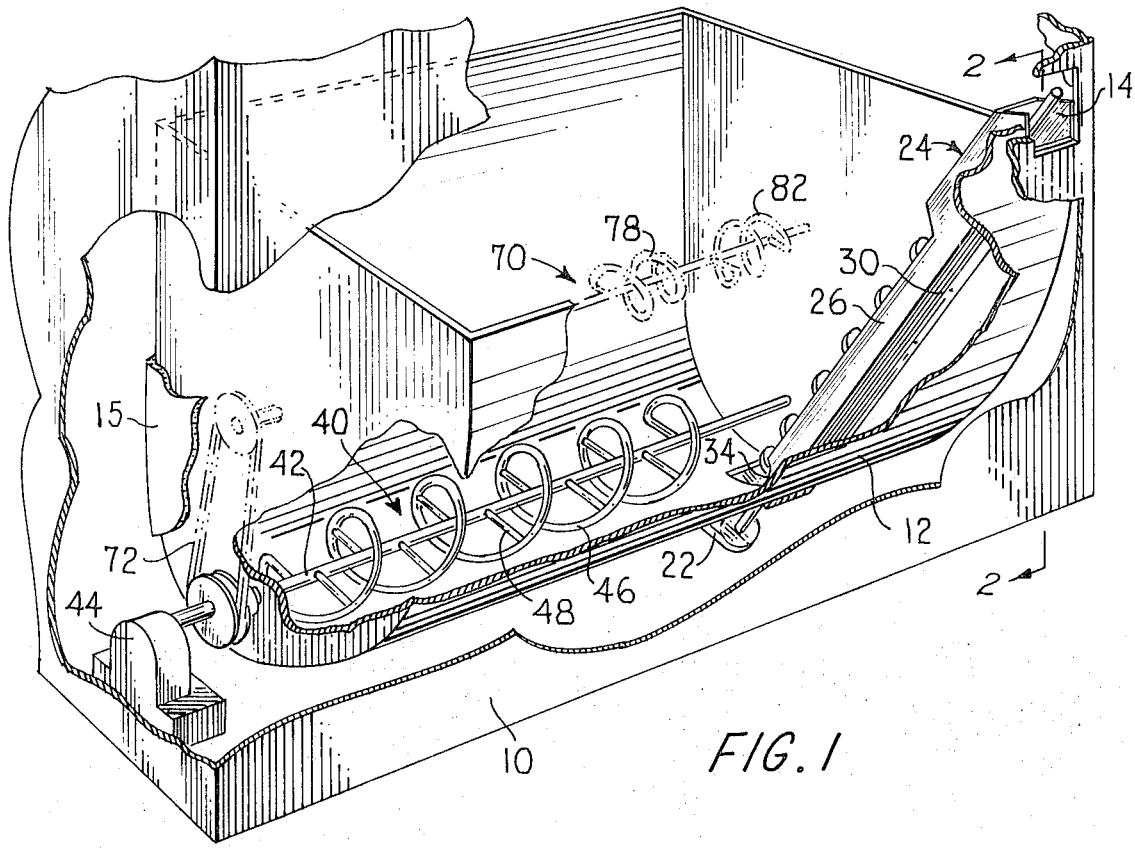
FIG. 1 is a perspective view with parts broken away of an ice dispensing apparatus in accordance with the present invention.

An ice dispenser in accordance with the present invention, as shown in FIG. 1, includes an outer housing 10 containing an ice storage bin 12 supported therein by a frame assembly (not shown). The housing 10 includes a dispensing aperture 14 positioned proximate the top of bin 12 adjacent one side thereof. The outer surface of bin 12 is covered by an insulating material 15 attached thereto in any suitable manner such as by an adhesive.

The top of bin 12 is intended to be exposed to a refrigeration system (not shown) which may be any type capable of preventing ice stored in the bin from melting. In addition, an ice maker (not shown) may also be positioned to deposit freshly made ice into the bin to thereby insure continual ice dispensing. However, the details of such refrigeration system and ice maker have not been included inasmuch as they do not constitute a material part of the invention disclosed therein.

Figure 2:
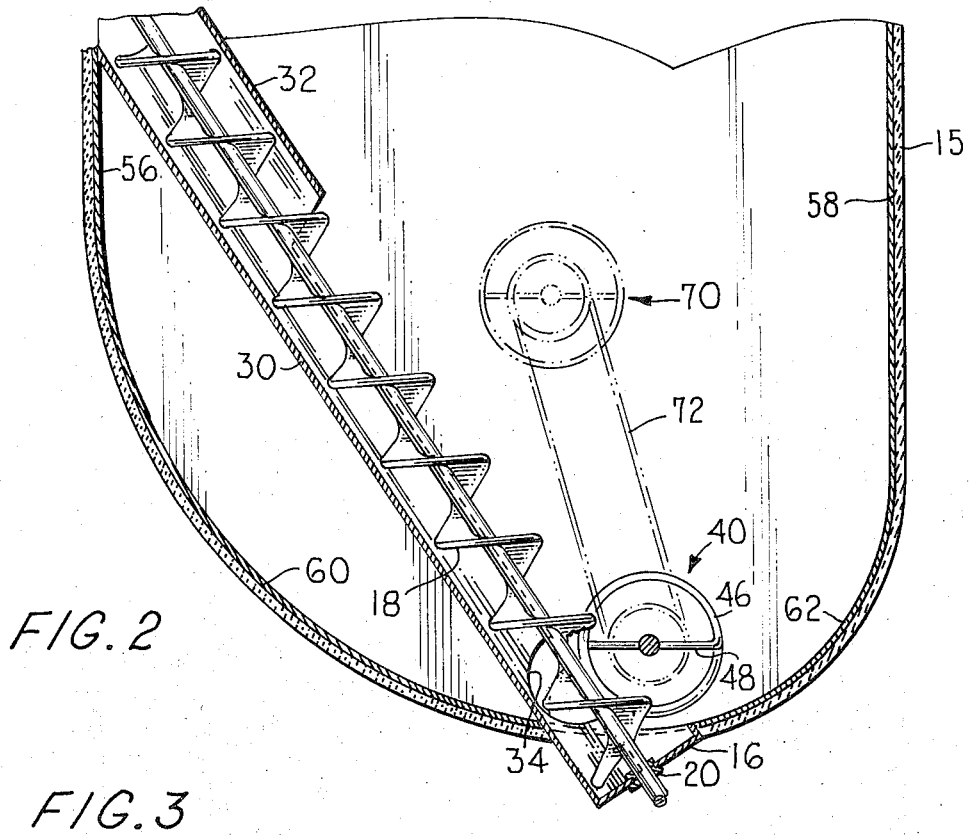
FIG. 2 is a cross-sectional view of an ice dispensing bin assembly of FIG. 1 taken along line 2—2.
Figure 3:
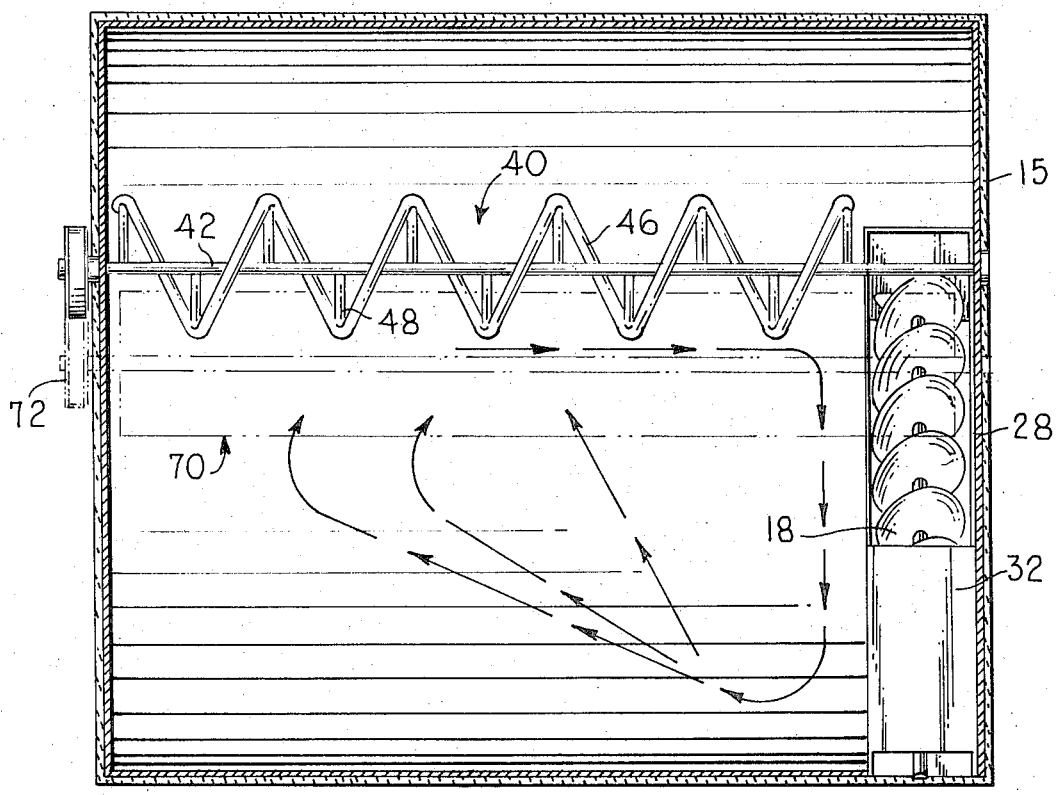
FIG. 3 is a top view of the ice dispensing bin assembly of FIG. 1.

A rectangular seat 16, best shown in FIGS. 2 and 3, is angularly recessed in the bottom of bin 12 at an end thereof in alignment with the dispensing aperture 14 in housing 10. The seat 16 is apertured for accommodating one end of a shaft of a dispensing conveyor such as an auger 18 which is rotatably supported at 20 in any conventional manner. The shaft of auger 18 is connected to a motor (not shown) disposed within housing 12 through an associated drive chain 22 in any conventional manner. The auger 18 extends from seat 16 to the aperture 14 in housing 12.

Figure 4:
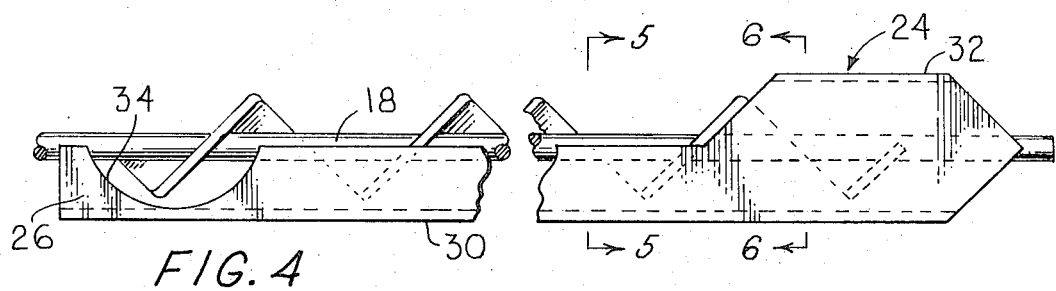
FIG. 4 is a side view of a conveyor assembly employed in the ice dispensing apparatus of FIG. 1.
Figure 5:
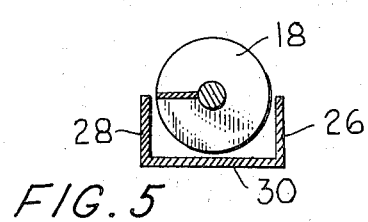
FIG. 5 is a cross section of the conveyor assembly of FIG. 4 taken along line 5—5.
Figure 6:
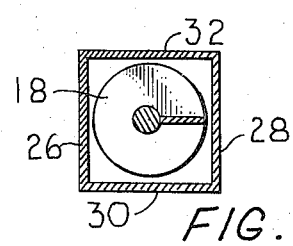
FIG. 6 is a cross section of the conveyor assembly of FIG. 4 taken along line 6—6.
Figure 7:
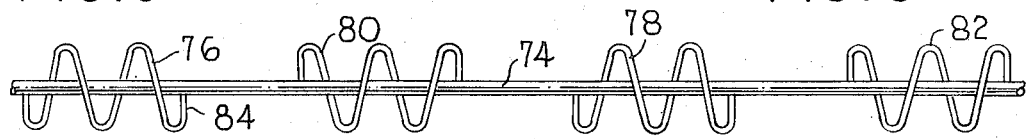
FIG. 7 is a plan view of a stirring auger in the ice dispensing apparatus of FIG. 1.

A rectangular channel 24, which extends from seat 16 to the dispensing aperture 14, is disposed about auger 18 to centralize same therein, as shown in FIGS. 4-6. The channel 24, which includes a pair of side walls 26 and 28 extending up from a base 30, is opened over most of its length adjacent seat 16 to expose the upper half of auger 18. The side walls 26 and 28 at the upper portion of channel 24 proximate the dispensing aperture 14 extend beyond the height of auger 18 and are joined by an upper wall 32 such that the auger 18 is completely encompassed at this portion of the channel 24. Side wall 26 includes a circular shaped cutout portion 34 positioned to coincide with the approximate bottom surface of bin 12.

An ice circulating auger 40 is disposed along the bottom of bin 12 and includes a central shaft 42 rotatably supported at the side walls in any conventional manner and extends to a motor drive system 44. Auger 40 further includes a rigid helical wire member 46 spaced from shaft 42 by a series of ribs 48 spaced along the shaft 42. The auger 40 extends to the dispensing auger 18 and is centrally positioned relative to cutout portion 34 in channel 24.

As shown in FIG. 2, the bin 12 is non-symmetrical when viewed from the side, and the auger 40 is positioned offset from the center, well toward the back of the bin, since it has been observed that a rotating horizontally disposed auger has a strong side and a weak side with respect to material being moved thereby. The rotating auger will throw off far more material from its strong side than from its weak side, and, accordingly, the auger 40 has been placed with its weak side facing the larger storage area at the front of bin 12 and the strong side facing the smaller storage area at the back of bin 12.

The bin 12 is four sided and has a curved bottom between upright front and back walls 56 and 58. The bottom includes a front bottom portion 60 in the form of a quarter-circle having a relatively large radius and a back bottom portion 62 also in the form of a quarter-circle having a relatively smaller radius with the shaft of auger 40 positioned substantially along the intersection of the respective bottom portions 60 and 62. In one example, a 6 inch diameter wire auger 40 was utilized in a bin 12 wherein the front bottom portion 60 had a radius of 22-¼ inches and the smaller diameter portion had a radius of 10-½ inches.

In operation, presuming a relatively full load of ice cubes or the like in bin 12, the dispensing auger 18 and wire auger 40 are rotated through their respective drive motors which may be selectively energized by depressing a power control switch (not shown) either by hand or by a receptacle to be filled with ice from the dispenser, such as a soda cup. The cubes of ice will then be moved by wire auger 40 toward the cutout portion 34 in channel 24. Some of the cubes will pass through cutout portion 34 into the channel 24 and seat 16 from where they will be upwardly conveyed along the corners of channel 24 by the blade of dispensing auger 18 to drop from aperture 14 into whatever ice receiving receptacle may be provided. Should an excessive amount of ice be moved up the channel 24, the edge of wall 32 acts to reduce the level of same and to break up any masses of fused ice cubes.

The ice that does not move through cutout portion 34 into channel 24 will generally take a circulation path as shown by the arrows in FIG. 3, tending to move from the strong side of auger 40 up one side of the curved front bottom portion 60 and thereafter moving downwardly to the back portion of auger 40 to be again moved toward the conveyor auger 18. This is the predominant movement of the undispensed ice in bin 12. The ice moved from the vicinity of auger 40 will also be replaced by ice from above as well as by the ice in the circulation path shown by the arrows. To a much lesser degree, some ice will move from the weak side to the strong side of auger 40 tending to travel up the incline of rear bottom portion 62 and back to auger 40.

As the dispensing continues, and the level of ice in the bin decreases to below the top of the wire auger 40, the basic circulatory paths described above will generally be maintained, and the ice on the front bottom portion 60 will be exhausted first followed by the ice on the back bottom portion with very little residual ice remaining in the bin.

As an optional feature, in situations where the upright walls of the bin are high, for the storage of larger amounts of ice, an additional wire auger 70, shown in phantom in FIGS. 1-3, may be rotatably positioned between the side walls at a level approximating half the height of the bin 12. Auger 70 can be driven by any suitable means such as by the motor drive system 44 through a chain drive 72, also shown in phantom.

The wire auger 70 includes a shaft 74 having a plurality of helical wires 76 and 78 wound about shaft 74 in a first direction, and another pair of helical wires 80 and 82 alternating with helical wires 76 and 78 and wound in an opposite direction thereto. A plurality of ribs 84 connect the helical wires 76, 78, 80 and 82 to shaft 74.

When the dispenser including the additional auger 70 is started to initiate the dispensing of ice, auger 70 will be rotated by the motor drive system 44 along with auger 40 through chain drive 72 or the like to break up any fused ice masses in the upper section of the bin 12. During such breaking up of the fused ice masses, very little lateral movement of the ice occurs due to the adjacent helical coils being oppositely wound to counteract each other's ice moving influence.

A dispensing apparatus is disclosed which is advantageous in that the interrelation of the single wire auger 40 and the arcuate bottom of the bin 12 enables almost complete removal of the ice therefrom due to the elimination of dead spots, in addition to establishing a thorough breaking of fused ice masses and circulation of the ice throughout the bin.

Inasmuch as the present invention is subject to many variations, modifications and changes in detail, it is intended that all matter contained in the foregoing description or shown in the accompanying drawings shall be interpreted as illustrative and not in a limiting sense.

What is claimed is:

1. An ice cube dispensing apparatus comprising:
 a storage bin having a pair of side walls and arcuately shaped bottom surface of continuous unbroken curvature including curved front and back portions each generally quarter-circle shaped, said front bottom portion being curved to a lesser degree than said back bottom portion;
 a first auger in said bin for dispensing ice cubes therefrom;
 a rectangular channel angularly disposed in said bin and encompassing said first auger to support the ice cubes being dispensed thereby, said rectangular channel being opened over a portion of its length to expose said auger and including a cutout in a side wall thereof proximate the bottom surface of said bin;
 a second auger in said bin positioned for rotational movement and having a feed end and a delivery end positioned proximate said first auger, said second auger including a shaft and a helical wire spaced from said shaft by rib means and being positioned along said bottom surface and offset from the center of said bin toward said back portion along the mutual intersection of said front and back bottom portions; said cutout being disposed proximate said delivery end of said second auger; and
 said first auger being disposed at a right angle to said second auger and said second auger being adapted to move ice cubes through said cutout to said first auger and ice cubes that do not move through said cutout into a circulation path wherein such cubes move up the curved front bottom portion of said bin and thereafter move downwardly to the feed end of said second auger to thereby effect the breaking up of fused ice cubes.

2. The invention of claim 1 wherein the quarter circle shaped front bottom portion has a radius approximately twice that of the back bottom portion.

3. The invention of claim 1 wherein said bin defines a recessed seat means therein for seating one end of said dispensing auger.

4. The invention of claim 1 including a housing encompassing said bin and having a dispensing aperture therein, and insulation means disposed about said bin.

5. The invention of claim 1 including a third auger having a plurality of helical coils wound about a shaft and connected thereto by a plurality of ribs, said third auger being rotatably positioned between said side walls of said bin in the middle portion thereof.

* * * * *